United States Patent [19]
Maki

[11] Patent Number: 5,893,901
[45] Date of Patent: Apr. 13, 1999

[54] TEXT TO VOICE APPARATUS ACCESSING MULTIPLE GAZETTEERS DEPENDENT UPON VEHICULAR POSITION

[75] Inventor: Kazuhiko Maki, Tokyo, Japan

[73] Assignee: Oki Electric Industry Co., Ltd., Tokyo, Japan

[21] Appl. No.: 08/746,340

[22] Filed: Nov. 8, 1996

[30] Foreign Application Priority Data

Nov. 30, 1995 [JP] Japan ................... 7-311979

[51] Int. Cl.$^6$ ........................... G10L 3/00
[52] U.S. Cl. ................ 704/260; 704/270; 704/274; 701/200
[58] Field of Search ............... 704/270, 273, 704/274, 276, 260; 701/200; 340/905; 434/130

[56] References Cited

U.S. PATENT DOCUMENTS

| | | | |
|---|---|---|---|
| 4,898,537 | 2/1990 | Pryor | 434/130 |
| 5,164,904 | 11/1992 | Sumner | 364/436 |
| 5,173,691 | 12/1992 | Sumner | 340/905 |
| 5,177,685 | 1/1993 | Davis et al. | 364/443 |

FOREIGN PATENT DOCUMENTS

| | | |
|---|---|---|
| 06 119144 | of 0000 | Japan. |
| WO 92 18345 | 11/1991 | WIPO. |

Primary Examiner—David R. Hudspeth
Assistant Examiner—Michael N. Opsasnick
Attorney, Agent, or Firm—Rabin & Champagne,P.C.

[57] ABSTRACT

An apparatus that changes text data into a voice signal based on the position of a vehicle is disclosed. A main gazetteer is subdivided into multiple area gazetteers, wherein each area gazetteer contains information corresponding to the mapping area that the vehicle is located. When the vehicle's position moves to a different mapping area, an analysis controller detects the change in mapping area and selects the new corresponding area gazetteer. The information of the new area gazetteer is then outputted as speech. This technique of subdividing the main gazetteer into area gazetteers increases the retrieval speed of information to the operator of the vehicle.

17 Claims, 11 Drawing Sheets

| | Key word | |
|---|---|---|
| LEAD | [liːd] | 4-2 |
| LEAD | [led] | 1-2 |
| BOW | [bou] | 4-4 |
| BOW | [bau] | 2-2 |
| ⋮ | ⋮ | ⋮ |

TEXT TO VOICE APPARATUS ACCESSING MULTIPLE GAZETTEERS DEPENDENT UPON VEHICULAR POSITION

BACKGROUND OF THE INVENTION

1. Field of the Invention

This invention relates to a text voice readup system for converting text data into voices and reading up the voices.

2. Description of the Related Art

Figure 2:
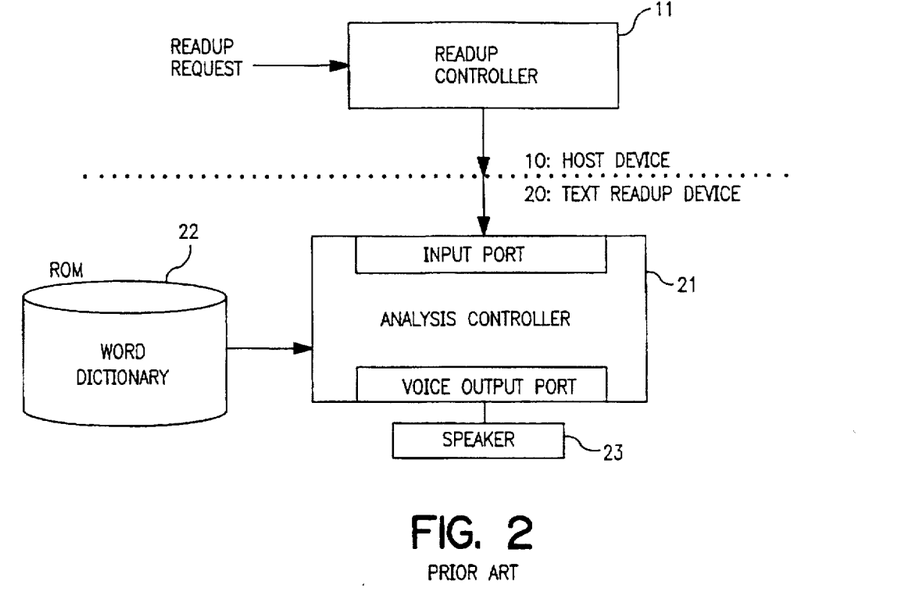
FIG. 2 is a block diagram illustrating a conventional text voice readup system.
Figure 3:
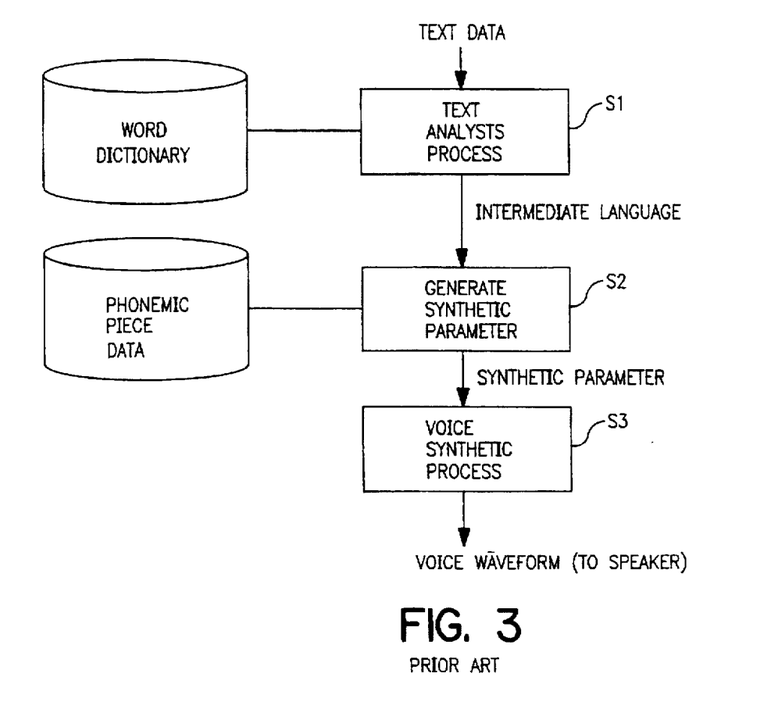
FIG. 3 is a flowchart for describing a process for outputting a voice waveform from the text voice readup system shown in FIG. 2.

FIG. 2 is a block diagram showing the configuration of a conventional text voice readup system. FIG. 3 is a flowchart for describing a process of outputting a voice waveform from the text voice readup system shown in FIG. 2.

The text voice readup system comprises a host device 10 and a text readup device 20. The host device 10 has a readup controller 11. The readup controller 11 supplies text data through its output to the text readup device 20. The text readup device 20 comprises an analysis controller 21, a read-only memory (hereinafter called "ROM") 22 having a word dictionary and phonemic piece data stored therein, and a speaker 23. The analysis controller 21 is composed of a CPU or the like, for example. The ROM 22 is electrically connected to the analysis controller 21. Namely, the analysis controller 21 and the ROM 22 are composed of programmable hardware. The text data is supplied to an input port of the analysis controller 21 from which it is outputted as a voice waveform through a voice output port thereof, followed by input to the speaker 23.

When a readup request and its contents or the like are passed to the readup controller 11 of the host device 10, the readup controller 11 creates a text to generate text data. When the text data is transferred to the analysis controller 21 in the text readup device 20, the analysis controller 21 performs a text analytical process S1 by reference to the word dictionary stored in the ROM 22 to create an intermediate language. When, for example, text data "Turn to the right at a Koyama intersection located 100 m ahead" is input, the analysis controller 21 retrieves the word dictionary to check the way of reading the data and its accent, thereby creating an intermediate language "Hyakumetorusakino koyamakousatenwo miginimagatsutekudasai". In accordance with the subsequent composite or synthetic parameter process S2, the analysis controller 21 uses the phonemic piece data with respect to the intermediate language to generate a synthetic parameter and converts it into a voice waveform in accordance with a voice synthesis process S3. The voice waveform is inputted to the speaker 23 from which a voice corresponding to the text data is sounded or produced. Thus, the system shown in FIG. 2 is operated based on software programs to thereby read up the text voice.

However, the conventional text voice readup system has the following problems.

When one attempts to store all place names in the ROM 22 in the text voice readup system such as a place-name readup car navigation system or the like, the following problems (1) and (2) arise:

(1) Data about a dictionary with for place names held in a dictionary becomes massive (e.g., 1.5 MB for 100,000 words) and hence the speed of retrieving the data from retreiving the ROM 22 is reduced. Further, since the capacity of the ROM 22 must increase, its cost is raised beyond the need.

(2) When homo-allophonic words or homographs which are read differently in the same notation exist, they cannot be suitably read up.

SUMMARY OF THE INVENTION

With the foregoing problems in view, it is an object of the present invention to provide a text voice readup system capable of preventing a reduction in its retrieval speed. It is another object of the present invention to provide a text voice readup system capable of accurately reading up homographs that may exist.

According to one aspect of the present invention, for achieving the above objects, there is provided a text voice readup system comprising:

area gazetteer reading means for reading an area gazetteer corresponding to information about the present position of a vehicle from divided area gazetteers;

an analysis controller for generating text data corresponding to the present position information and analyzing the text data, using the area gazetteer as a high-priority temporary dictionary; and a text readup device for producing voices corresponding to the text data.

BRIEF DESCRIPTION OF THE DRAWINGS

While the specification concludes with claims particularly pointing out and distinctly claiming the subject matter which is regarded as the invention, it is believed that the invention, the objects, features and advantages thereof will be better understood from the following description taken in connection with the accompanying drawings in which:

DETAILED DESCRIPTION OF THE PREFERRED EMBODIMENTS

[First Embodiment]

Figure 1:
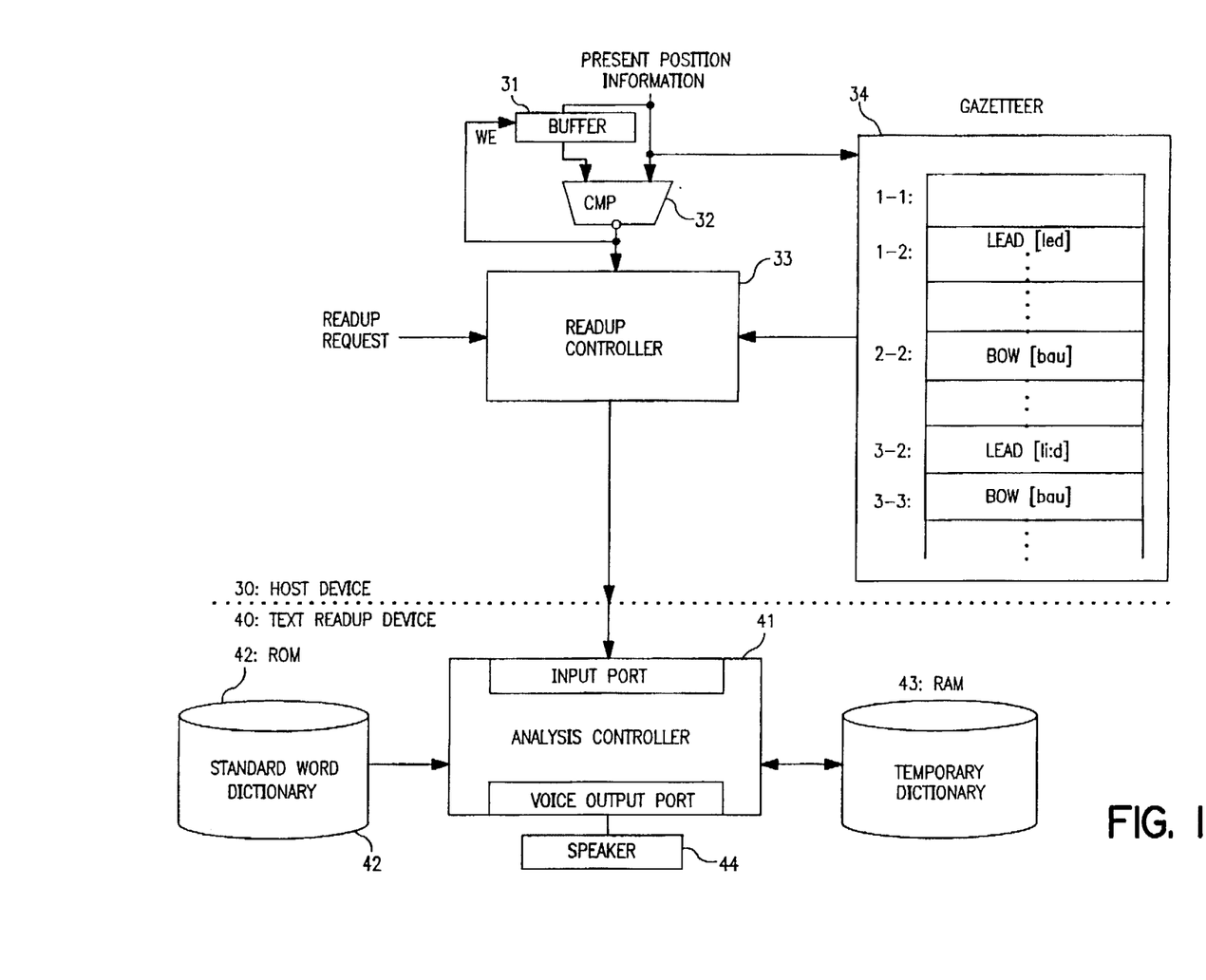
FIG. 1 is a block diagram of a text voice readup system according to a first embodiment of the present invention.

FIG. 1 is a block diagram of a text voice readup system showing a first embodiment of the present invention.

The text voice readup system is suitable for use in a car navigation system, for example and comprises a host device 30 and a text readup device 40.

The host device 30 comprises a buffer 31 which serves as a buffer means for temporarily storing therein information about the present position of a vehicle, a comparator (CMP) 32 which serves as a comparing means for comparing information about the present position of the vehicle at its observation with the present position information outputted from the buffer 31, a readup controller 33, and a slow-speed large capacity storage medium 34 such as a CD-ROM or the like having a geographical dictionary or gazetteer stored therein. The output of the comparator 32 is electrically connected to the readup controller 33 so that an inverted output signal produced from the comparator 32 is inputted to the readup controller 33. Further, the inverted output signal of the comparator 32 is also used as a write enable signal (WE) to be supplied to the buffer 31. The readup controller 33 is composed of a CPU or the like and constitutes a text data supplying means, an area gazetteer reading means and an area gazetteer transferring means. Namely, the readup controller 33 has a function to be used as the text data supplying means, for supplying text data to the text readup device 40, a function to be used as the area gazetteer reading means, for reading each divided area gazetteer of the gazetteer from the storage medium 34 with the present position information as a keyword, and a function to be used as the area gazetteer transferring means, for transferring the area gazetteer to the text readup device 40.

Figure 4:
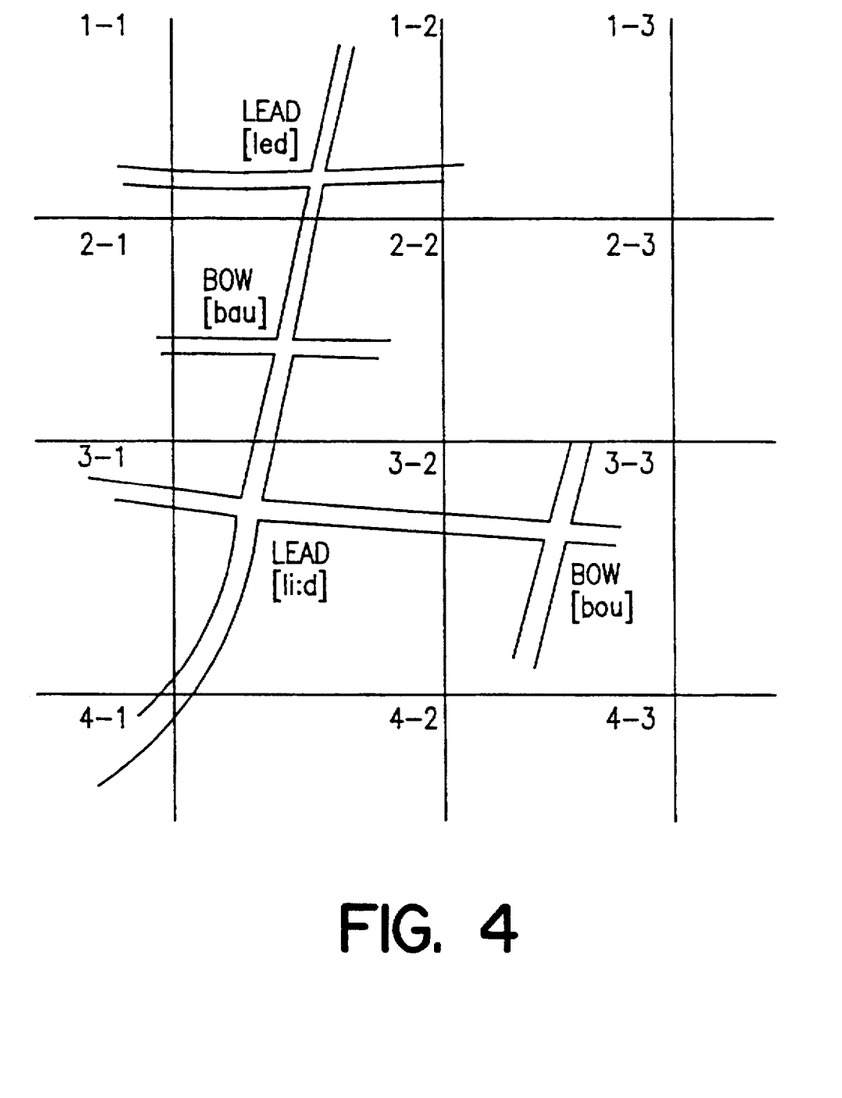
FIG. 4 is a map for use in describing an area gazetteer.

FIG. 4 is a map for use in describing an area gazetteer.

The gazetteer stored in the storage medium 34 is composed of a plurality of area geographical dictionaries or gazetteers. The respective area gazetteers are respectively created so as to correspond to area maps divided into plural form to such an extent as to exclude homographs shown in FIG. 4. The respective area gazetteers respectively capture place names in the divided areas. In the specification of applicant's corresponding Japanese application, the words expressed in the hexadecimal codes "3E2E" and "3B33" as defined in the JIS Code, i.e., the words pronounced as "Oyama" and "Koyama", and the words expressed in the hexadecimal codes "3866" and "3A64", as defined in the JIS Code, i.e., the words pronounced as "Onzaka" and "Misaka" are described by way of example. However, the in the present description the exemplary words Oyama and Koyama are respectively replaced by LEAD and used as place names pronounced as [led] and [li:d], and the exemplary words Onzaka and Misaka are respectively replaced by BOW and used as place names pronounced as [bau] and [bou].

Two-dimensionally expressed keywords (1-1, 1-2, . . . , 4-3) indicative of the gazetteer areas are stored in the storage medium 34 in a state in which they have been added to the area gazetteers as respective addresses. As a division example, high-order digits for latitude and longitude are used in actuality. Incidentally, the addresses may not be two-dimensionally expressed as shown in FIG. 1 or 4 but one-dimensionally expressed.

The text readup device 40 comprises an analysis controller 41 composed of a CPU or the like, a ROM 42, a random access memory (hereinafter called "RAM") 43 corresponding to a memory means, and a speaker 44. The speaker 44 is electrically connected to a voice output port of the analysis controller 41.

The ROM 42 stores a standard word dictionary and phonemic piece data therein. The RAM 43 is used as a temporary dictionary having priority over the ROM 42. The area gazetteers are written into the RAM 43 through the analysis controller 41.

The operation of the text readup system shown in FIG. 1 will next be described.

When the present position of a vehicle is located in the area 3-3 shown in FIG. 4, for example, the buffer 31 stores present position information about "3-3" therein. When the vehicle enters from the area 3-3 to the area 3-2 as it moves, the present position information varies. Thus, the comparator 32 compares the present position information "3-2" and the present position information "3-3" outputted from the buffer 31 and supplies an inverted output signal corresponding to the result of comparison to the readup controller 33 as a dictionary load request signal. The readup controller 33 sets the present position information "3-2" as a keyword's address and reads an area gazetteer corresponding to the address for "3-2" from the storage medium 34. Simultaneously with the reading of the area gazetteer, the buffer 31 captures the present position information "3-2" and stores it therein. The readup controller 33 transfers the read area gazetteer corresponding to "3-2" to the analysis controller 41 of the text readup device 40. The analysis controller 41 loads the transferred area gazetteer of "3-2" into the RAM 43.

When a readup request and its contents are directed to the readup controller 33, the readup controller 33 creates a text to generate text data. When a text "Vehicle will soon reach a LEAD intersection, for example, is transferred to the analysis controller 41 as the text data, the analysis controller 41 performs a text analytical process by reference to the contents stored in the ROM 42 and RAM 43. Since the information about the place name of the present position "3-2" has been stored in the RAM 43 as the temporary dictionary, the analysis controller 41 utilizes the temporary dictionary on a priority basis. As a result, the LEAD of the homograph is analyzed as [li:d] and an intermediate language that "Vehicle will soon reach a LEAD [li:d] intersection" is formed. In accordance with the subsequent synthetic or composite parameter process, the analysis controller 41 generates a composite parameter for the intermediate language by using the phonemic piece data stored in the ROM 42. Further, the analysis controller 41 converts it into a voice waveform in accordance with a voice composite process and outputs it to the speaker 44. The speaker 44 sounds or produces a voice "Car will soon reach the LEAD [li:d] intersection" corresponding to the text data. Subsequently, even when the car enters into the areas 2-2 and 1-2 with its movement, the present system is activated in the same manner as described above and accurately reads up BOW [bou], LEAD [led] and the like.

In the first embodiment as described above, the buffer 31 and the comparator 32 are provided within the host device 30 and the area gazetteers divided into the small sections are taken in the RAM 43 as the temporary dictionaries. It is therefore possible to prevent the ROM 42 from being brought into massive form, reduce an increase in cost and promptly retrieve the place name. Further, a text voice readup system can be obtained which performs an accurate and degradation-free readup.

[Second embodiment]

Figure 5:
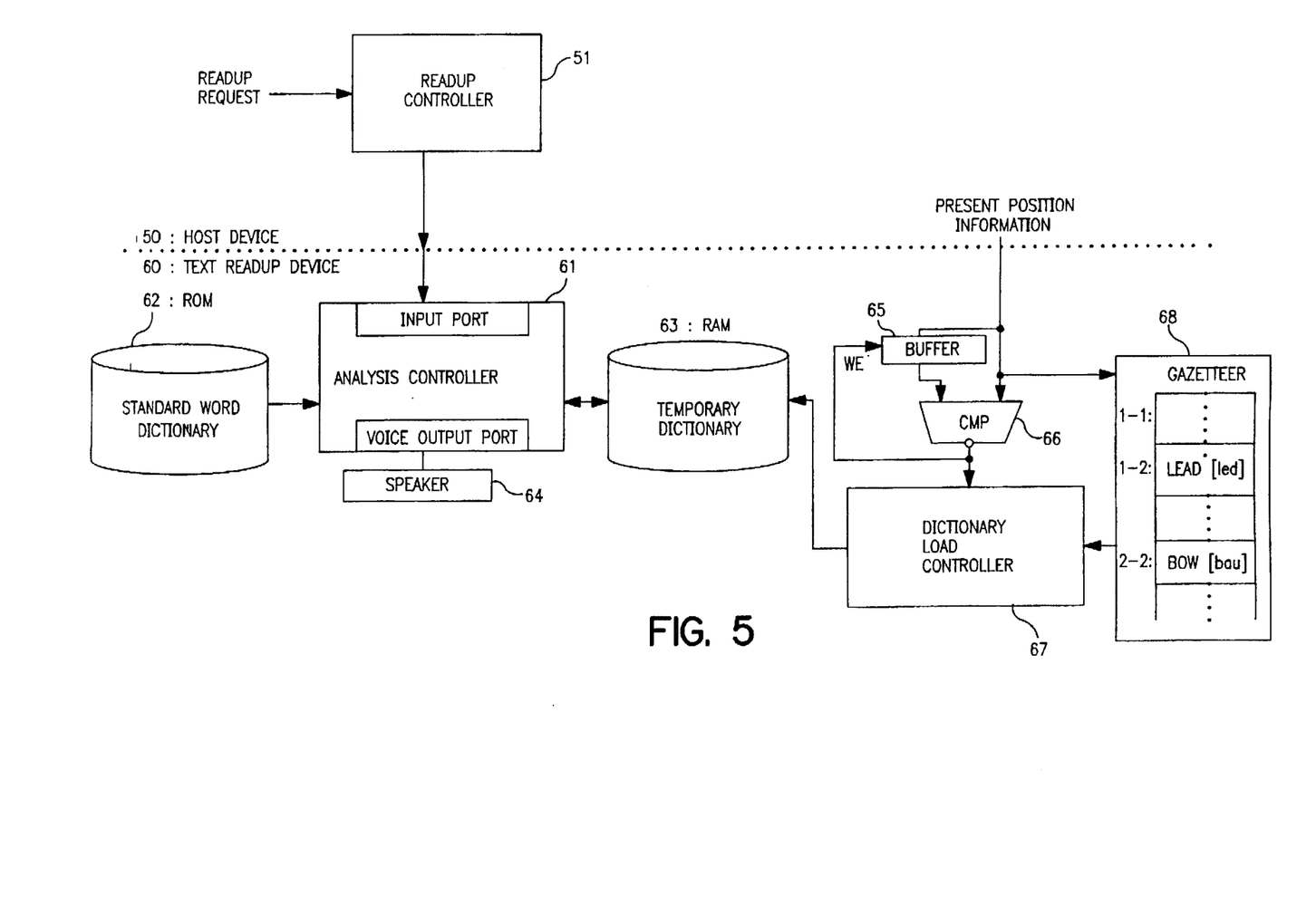
FIG. 5 is a block diagram of a text voice readup system according to a second embodiment of the present invention.

FIG. 5 is a block diagram of a text voice readup system according to a second embodiment of the present invention.

The present text voice readup system is employed in a car navigation system, for example and comprises a host device 50 and a text readup device 60.

The host device 50 has a readup controller 51 for supplying text data to the text readup device 60. The text readup device 60 comprises an analysis controller 61 composed of a CPU or the like, a ROM 62, a RAM 63 corresponding to a memory means, and a speaker 64. The analysis controller 61 is configured so as to refer to the ROM 62 and RAM 63. The speaker 64 is electrically connected to a voice output port of the analysis controller 61. Further, the text readup device 60 includes a buffer 65 serving as a buffer means for temporarily storing therein information about the present position of a vehicle, which is inputted through the host device 50, a comparator 66 for comparing information about the present position of the vehicle at its observation with the present position information outputted from the buffer 65, a dictionary load controller 67, and a slow-speed large capacity storage medium 68 such as a CD-ROM or the like having a geographical dictionary or gazetteer stored therein. The output of the comparator 66 is electrically connected to the dictionary load controller 67 so that an inverted output signal produced from the comparator 66 is inputted to the dictionary load controller 67 as a dictionary load request signal. Further, the inverted output signal of the comparator 66 is also used as a write enable signal WE to be supplied to the buffer 65. The dictionary load controller 67 is also composed of a CPU or the like and constitutes an area gazetteer reading means for the storage medium 68. Namely, the dictionary load controller 67 has the function of reading each divided area geographical dictionary or area gazetteer of the gazetteer from the storage medium 68 with the present position information as a keyword, and loading it into the RAM 63. The gazetteer stored in the storage medium 68 is similar to that stored in the storage medium 34 employed in the first embodiment and is composed of a plurality of area gazetteers in which positions on a map are defined as addresses.

The operation of the text voice readup system shown in FIG. 5 will next be described.

When the present position of the vehicle is located in the area 3-3 shown in FIG. 4, for example, the present position information supplied from the host device 50 is inputted to the buffer 65 where the present position information about "3-3" is stored therein. When the vehicle enters from the area 3-3 to the area 3-2 as it moves, the present position information varies. Thus, the comparator 66 compares the present position information "3-2" at this time and the present position information "3-3" outputted from the buffer 65. Since they are found to be different from each other from the result of comparison, the comparator 66 sends the dictionary load request signal to the dictionary load controller 67. The dictionary load controller 67 reads an area gazetteer corresponding to an address for "3-2" from the storage medium 68 with the present position information "3-2" as a keyword's address and loads it into the RAM 63. At the same time, the buffer 65 captures the present position information "3-2" and stores it therein.

When a readup request and its contents are directed to the readup controller 51, the readup controller 51 in the host device 50 prepares a text to generate text data. The text data is inputted to the analysis controller 61 in the text readup device 60. The analysis controller 61 performs a text analytical process referring to the contents of the ROM 62 and the RAM 63, preferentially using the contents of the RAM 63 used as a temporary dictionary. Subsequently, the same process as that employed in the first embodiment is carried out and hence the reading of a suitably-converted place name is done through the speaker 64.

In the second embodiment as described above, the text readup device 60 has the buffer 65 for temporarily storing the present position information inputted thereto through the host device 50, the comparator 66 for comparing the information about the present position of the vehicle at its observation and the present position information outputted from the buffer 65, the dictionary load controller 67 and the storage medium 68. Therefore, when the vehicle is shifted from the present position, a dictionary for an area at its shift is automatically loaded into the RAM 63. Thus, since the host device 50 does not perform a dictionary interchange process, a desired place name can be promptly retrieved. It is therefore possible to realize a text voice readup system capable of providing an accurate voice readup.

[Third embodiment]

Figure 6:
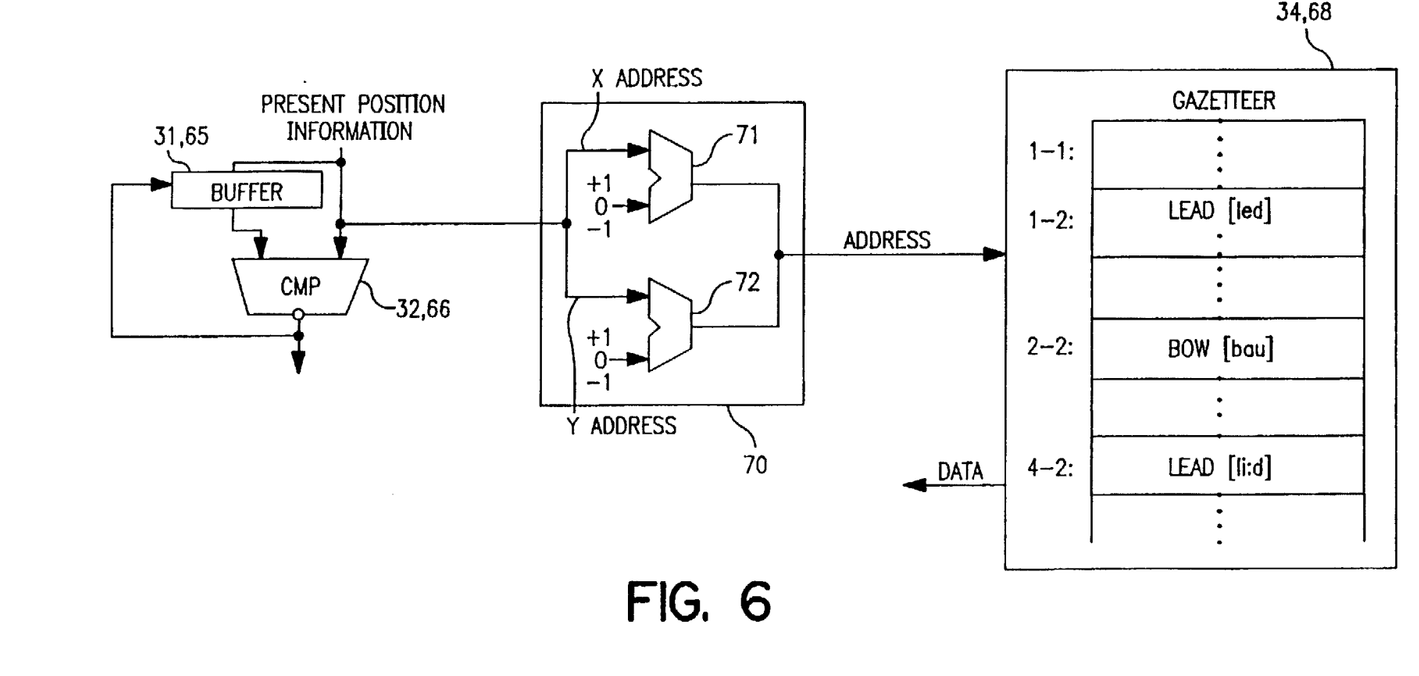
FIG. 6 is a circuit diagram of a group address generating means according to a third embodiment of the present invention.

FIG. 6 is a circuit diagram of a group address generating means showing a third embodiment of the present invention.

In the first and second embodiments, the area gazetteer developed on the RAM 43 or RAM 63 used as the temporary dictionary, corresponds to one area alone. However, the present embodiment is characterized in that a plurality of area gazetteers corresponding to peripheral areas are also developed on the RAM 43 or RAM 63. Therefore, the group address generating means 70 shown in FIG. 6 is provided at an address input unit of the storage medium 34 shown in FIG. 1 or the storage medium 68 shown in FIG. 5.

The group address generating means 70 shown in FIG. 6 has two arithmetic elements 71 and 72 for respectively inputting therein information about the present position of the vehicle at its observation. The arithmetic element 71 adds 1, 0 or −1 to an x address for the present position information. The arithmetic element 72 adds 1, 0 or −1 to a y address for the present position information. Addresses outputted from the arithmetic elements 71 and 72 are combined into a group address, which in turn is supplied to each of the storage mediums 34 and 68. In the present embodiment, each address is two-dimensionally expressed. However, if the address is represented on a one-dimensional basis, then a single arithmetic element is used.

Figure 7:
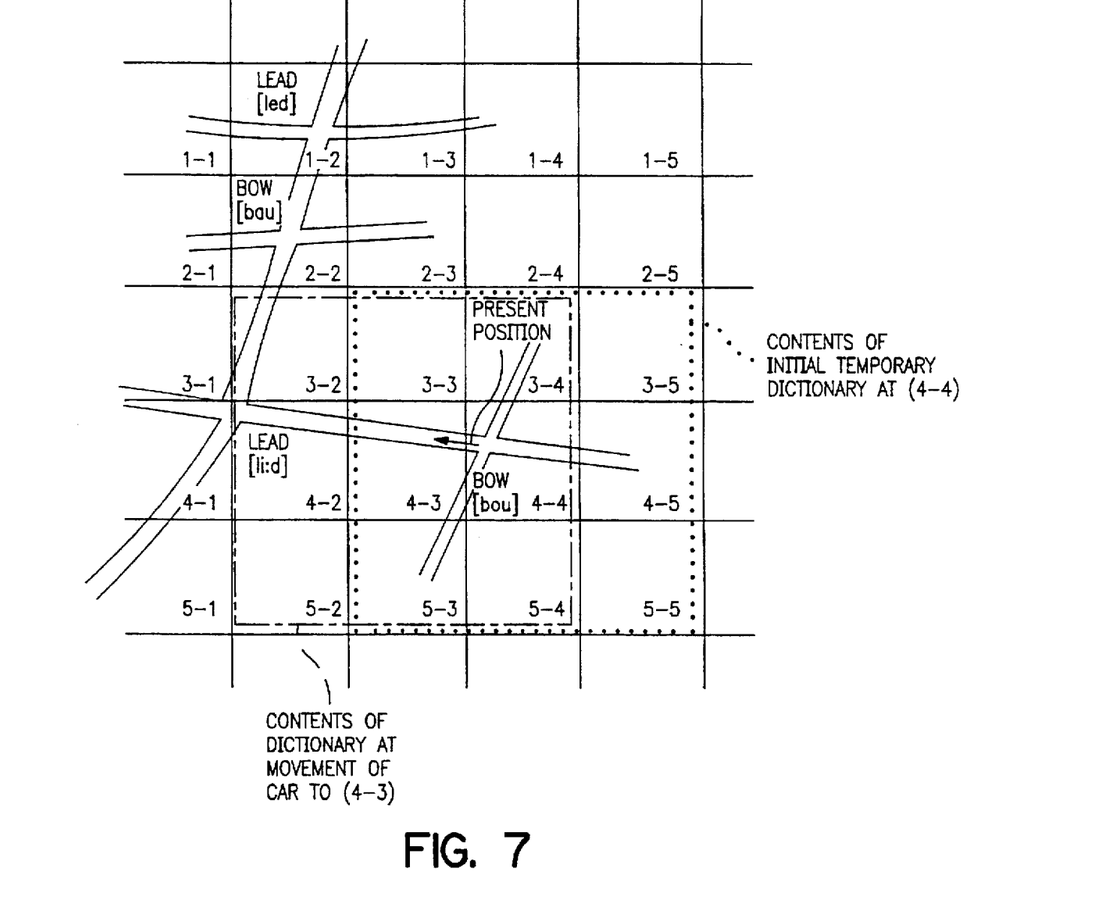
FIG. 7 is a view for use in describing the area gazetteers stored in a RAM shown in FIG. 1 or 5, with reference to FIG. 6.

FIG. 7 is a view for describing each area gazetteer stored in the RAM shown in FIG. 1 or 5 by reference to FIG. 6.

When the present position information is placed in an area 4-4, a group address outputted from the group address generating means 70 corresponds to the area 4-4 and areas 3-3, 3-4, 3-5, 4-3, 4-5, 5-3, 5-4 and 5-5 provided around the area 4-4. Therefore, area gazetteers corresponding to the respective areas 4-4, 3-3, 3-4, 4-3, 4-4, 4-5, 5-3 and 5-4 are stored in the RAM 43 or RAM 63. When the present position of the vehicle is changed to the area 4-3 with its movement, the comparator 32 or 66 outputs a dictionary load request signal therefrom and the group address generating means 70 outputs a group address. At this time, the group address outputted from the group address generating means 70 corresponds to the area 4-3 and the areas 3-2, 3-3, 3-4, 4-2, 4-4, 5-2, 5-3 and 5-4 provided around the area 4-3. Area gazetteers associated with the plurality of addresses are read and stored in the RAM 43 or 63. The analysis controller 41 or 61 refers to the area gazetteers corresponding to the original area 4-3 and the like until a plurality of new area gazetteers are stored in the RAM 43 or 63. After the storage of the new area gazetteers in the RAM 43 or 63 have been completed, the analysis controller 41 or 61 refers to the new area gazetteers to perform a text analytical process.

In the third embodiment as described above, the area gazetteers corresponding to the peripheral areas including the present position area can be stored in the RAM 43 or 63 because of the provision of the group address generating means. Thus, even immediately after the present position of the vehicle has been shifted to a new area, the present embodiment can cover its case and no longer interferes with accurate readup.

[Fourth embodiment]

Figure 8:
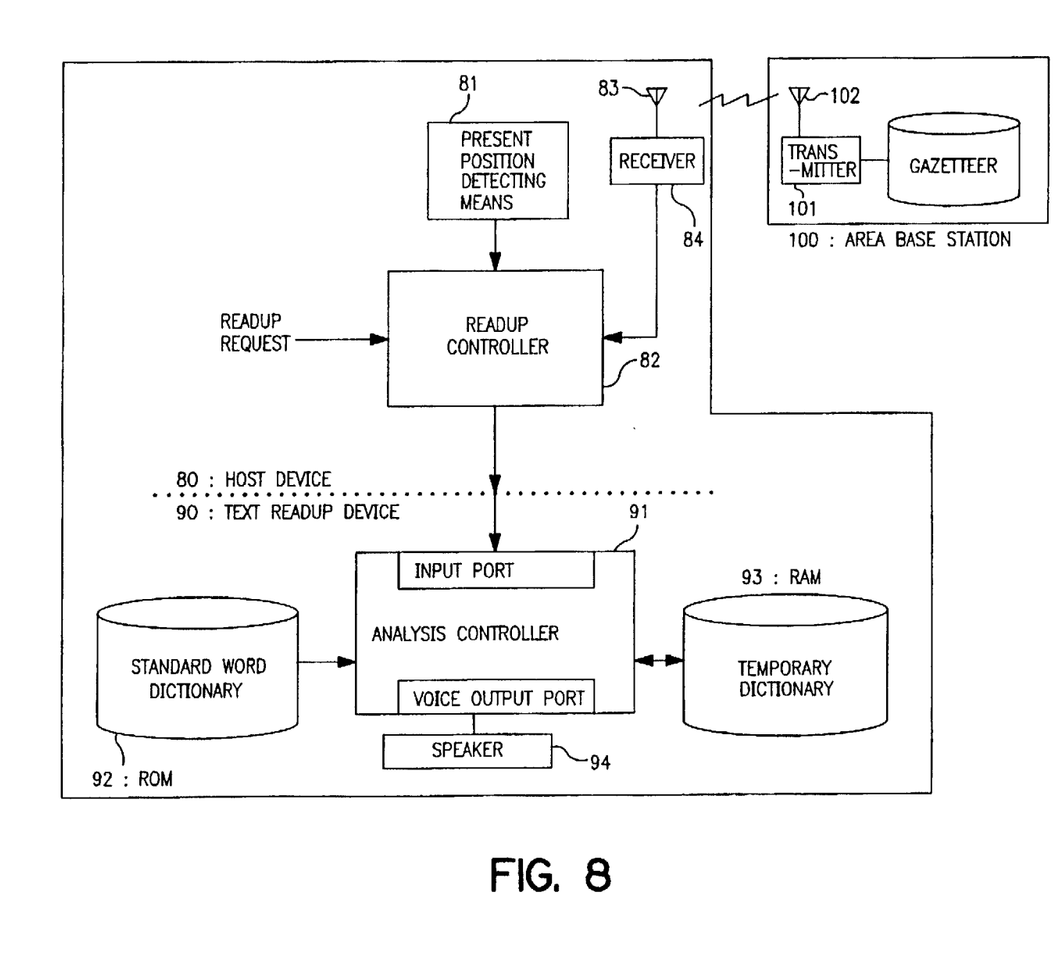
FIG. 8 is a configurational block diagram of a text voice readup system according to a fourth embodiment of the present invention.

FIG. 8 is a block diagram of a text voice readup system according to a fourth embodiment of the present invention.

The present text voice readup system is effective in a car navigation system, for example and has a host device 80 and a text readup device 90. The host device 80 comprises a present position detecting means 81, a readup controller 82, an antenna 83 and a receiver 84. The present position detecting means 81 is composed of, for example, an unillustrated buffer and a comparator provided in a manner similar to FIG. 1 that illustrated in FIG. 1, and sends a dictionary load request signal to the readup controller 82. The antenna 83 is electrically connected to the receiver 84 and the output of the receiver 84 is electrically connected to the readup controller 82. The text readup device 90 comprises an analysis controller 91 composed of a CPU or the like, a ROM 92, a RAM 93 which serves as a memory means, and a speaker 94. The analysis controller 91 refers to the ROM 92 and the RAM 93. The speaker 94 is electrically connected to a voice output port of the analysis controller 91.

An area gazetteer sent from an area base station 100 through a transmitter 101 and an antenna 102 is received by the receiver 84 via the antenna 83. The area gazetteer, which has been received by the receiver 84, is supplied to the readup controller 82. The readup controller 82 in the host device 80 has the function of transferring the area gazetteer sent from the area base station 100 to the text readup device 90 as well as having the function similar to the conventional one, of creating text data and supplying it to the text readup device 90. On the other hand, the analysis controller 91 in the text readup device 90 causes the RAM 93 to store the transferred area gazetteer therein.

The operation of the text voice readup system shown in FIG. 8 will next be described.

Map information is divided into pieces of information in area units. They are held in area base stations disposed in their corresponding individual areas as area geographical dictionaries or gazetteers. The pieces of divided map information include information about varying place names or shop names, etc. within their areas. They are updated whenever necessary. When the vehicle now enters into a new area, the present position detecting means 81 detects its entrance and supplies the dictionary load request signal to the readup controller 82. The readup controller 82 receives an area gazetteer sent from the area base station 100 therein through the antenna 83 and the receiver 84 and transfers it to the analysis controller 91. The analysis controller 91 causes the RAM 93 to store the transferred area gazetteer therein. Thus, the contents of the RAM 93 used as a temporary dictionary is brought up to date. Incidentally, the area gazetteer received from the area base station 100 may be received so as to include even peripheral area gazetteers other than that being under the authority or control of the area base station 100.

When the readup controller 82 creates text data according to the demand and transfers it to the analysis controller 91, the analysis controller 91 performs a process of analyzing the text data preferentially using the contents of the RAM 93 in a manner similar to the first embodiment. Thus, the speaker 94 produces a voice corresponding to the text data.

According to the fourth embodiment as described above, since the receiver 84 is provided in the text voice readup system and receives the area gazetteer transmitted from the corresponding area base station 100, the present system can refer to the latest gazetteers capable of coping with frequently-varied shop names or the like.

[Fifth embodiment]

Figure 9:
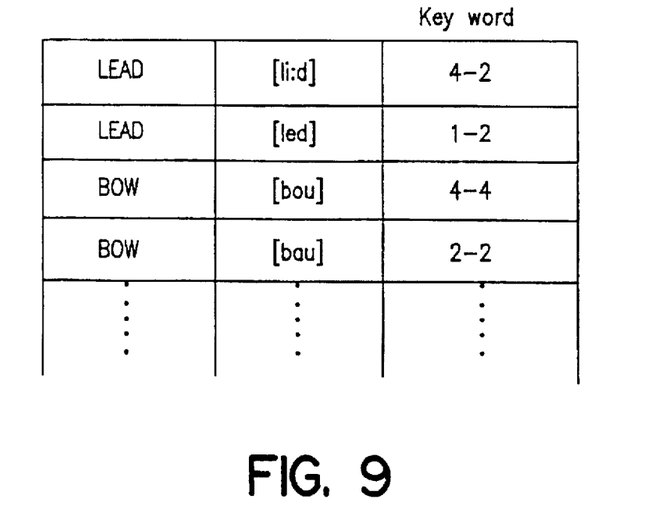
FIG. 9 is a view for use in describing an area gazetteer structure according to a fifth embodiment of the present invention.

FIG. 9 is a table for describing an area gazetteer structure according to a fifth embodiment of the present invention.

In the present embodiment, each of the structures of the area gazetteers stored in the memory means RAMs 43, 63 and 93 employed in the first through fourth embodiments is represented in the form of a table shown in FIG. 9. Namely, respective pairs of words and their readings (pronunciation) are respectively associated with fields of keywords and stored in the RAMs 43, 63 and 93. Each keyword may express the area gazetteer. Alternatively, each individual area gazetteer may be represented in further division units.

Figure 10:
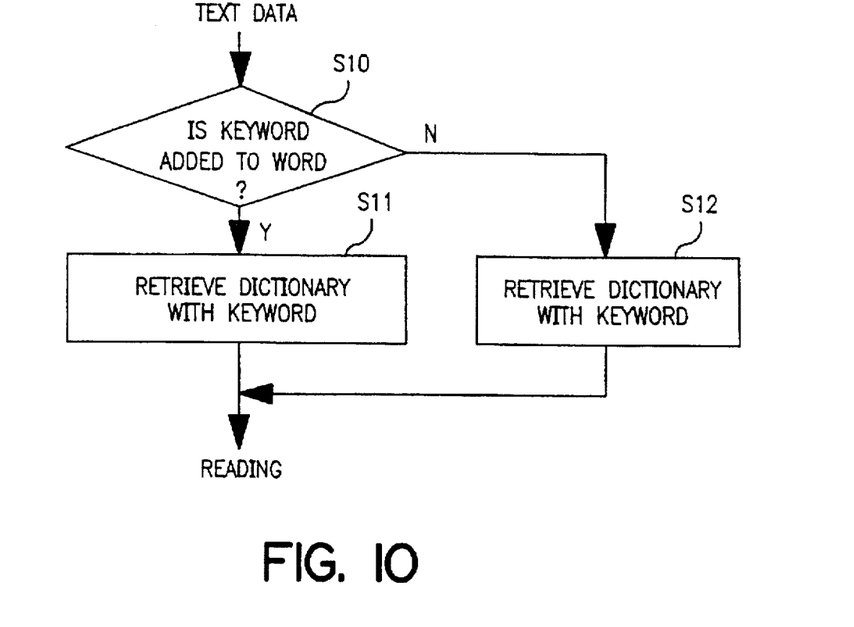
FIG. 10 is a view for use in describing the operation of the text voice readup system having the structure shown in FIG. 9.

FIG. 10 is a flow diagram for describing the operation of the text voice readup system at the time that the structure shown in FIG. 9 has been adopted.

Text data is provided with keywords and transferred from the readup controller 33, 51 or 82 to the analysis controller 41, 61 or 91. The text data is transferred to the analysis controller in a state of "... at a LEAD (1-2) intersection as viewed from a BOW (2-2) intersection", for example. The individual analysis controllers 41, 61 and 91 confirm in Step S10 of FIG. 10, whether keywords are provided every words. In Step S12, keyword-free words are read and retrieved in accordance with the normal method, followed by supply to the analysis controller. Thereafter, a reading with respect to "... at a LEAD (1-2) intersection as viewed from a BOW (2-2) intersection" is obtained as "... at a LEAD [led] intersection as viewed from a BOW [bau] intersection".

According to the present embodiment as described above, since the place names in each area gazetteer are provided so as to correspond to the keywords as shown in FIG. 9, accurate readings can be retrieved even if any number of homographs exist.

[Sixth embodiment]

A car navigation system has a route function (route searching function). The expected route for traffic to the destination is determined by the route function. A car navigation system showing a text voice readup system according to the present embodiment is characterized by storing each area gazetteer corresponding to the traffic proposed route determined by the route function in the memory means employed in the first through fifth embodiments and utilizing it as a temporary dictionary having priority over a word dictionary.

Figure 11:
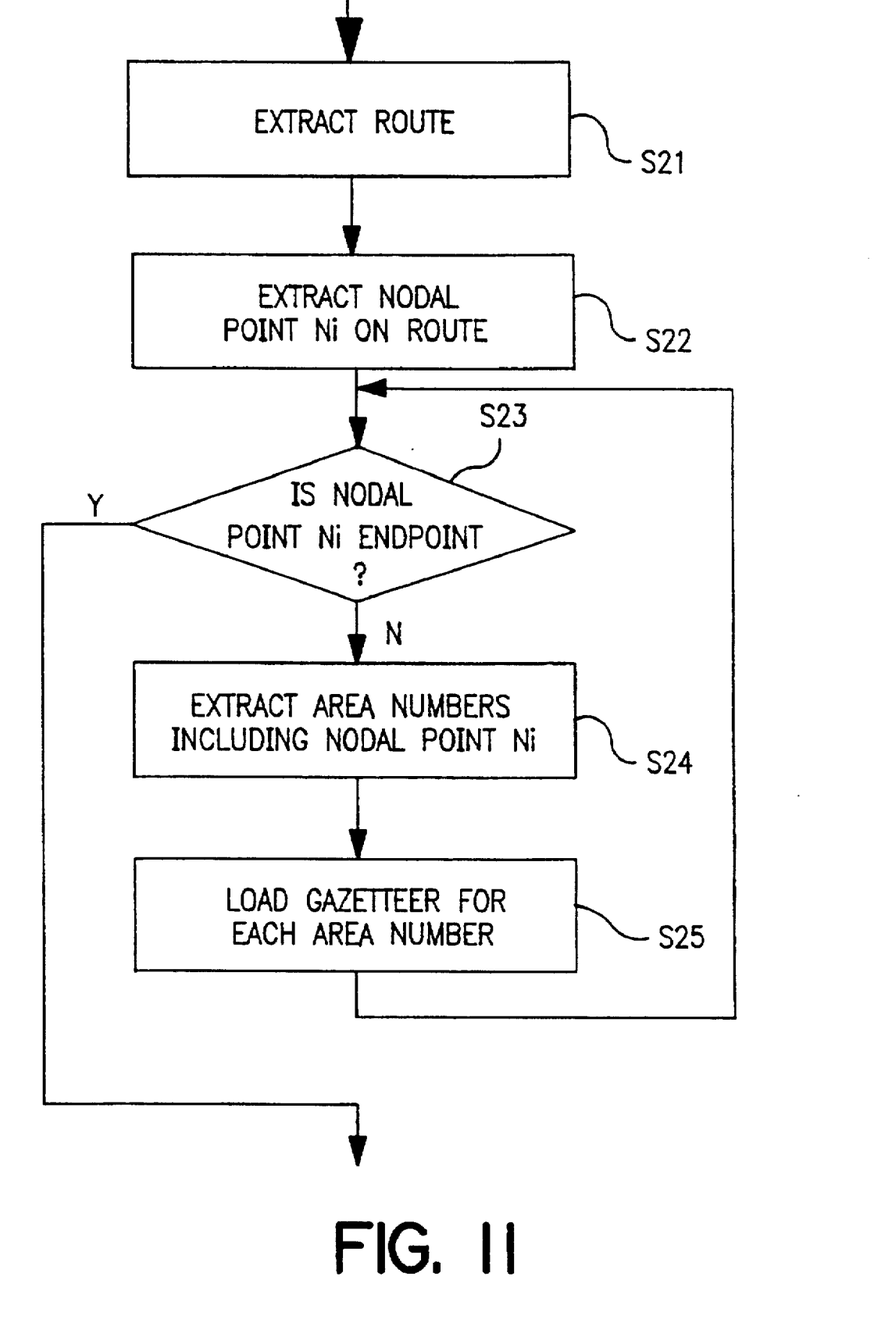
FIG. 11 is a flowchart for use in describing the operation of a means for storing an area gazetteer according to a sixth embodiment of the present invention.
Figure 12:
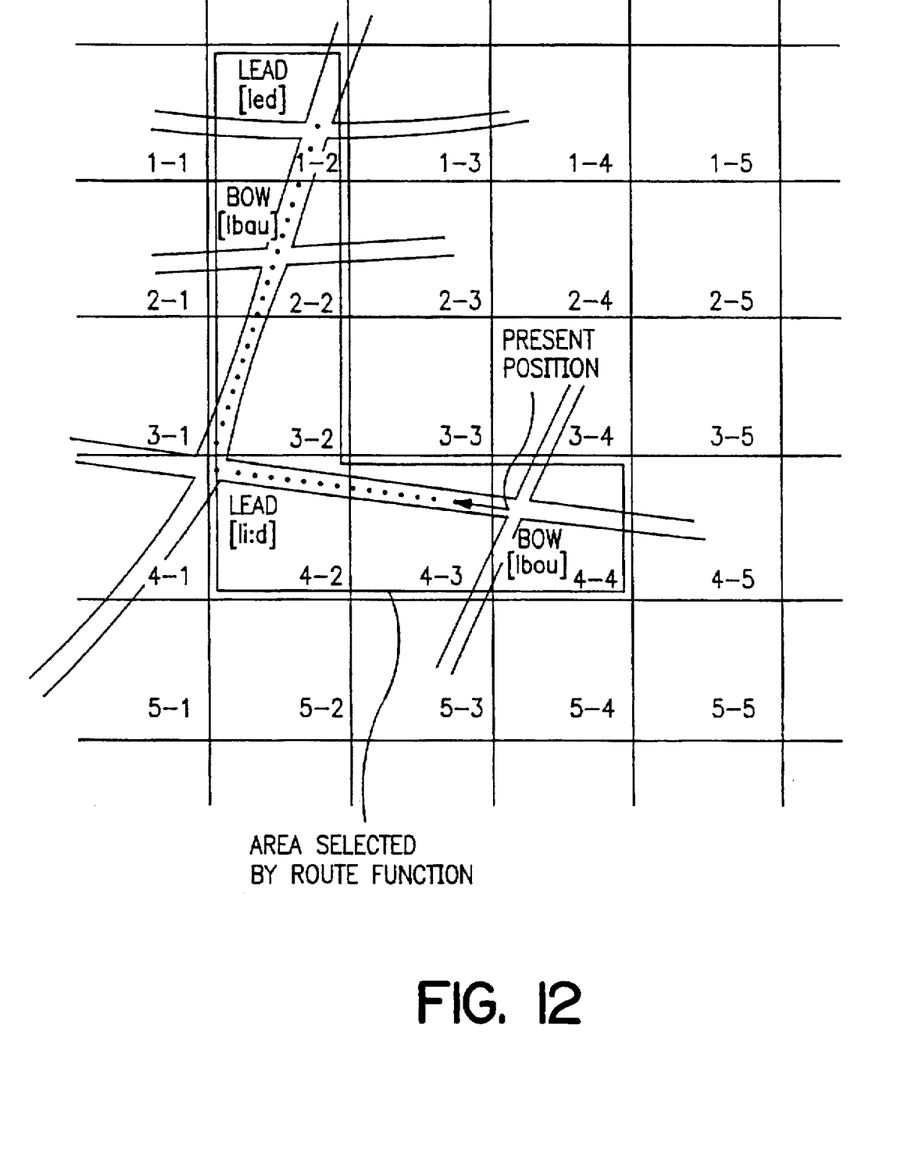
FIG. 12 is a map for use in describing a traffic proposed route determined in FIG. 11.
Figure 13:
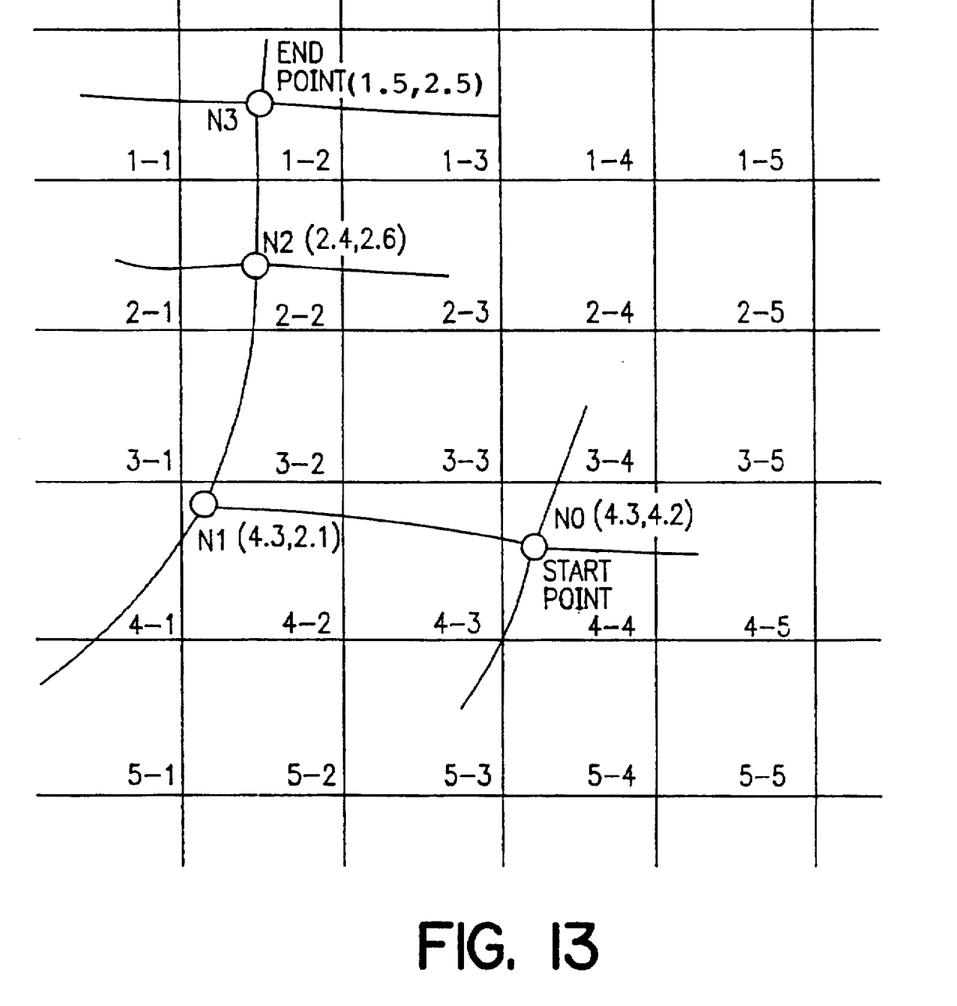
FIG. 13 is a map for use in explaining nodal points determined in FIG. 11.

FIG. 11 is a flowchart showing a procedure for storing area gazetteers, according to a sixth embodiment of the present invention. FIG. 12 is a map illustrating a traffic proposed route determined in FIG. 11. FIG. 13 is a map for describing nodal points determined in FIG. 11. A method of storing area gazetteers associated with the traffic proposed route will now be described with reference to FIGS. 11 through 13.

Now consider that the RAM 43 in the text voice readup system according to the first embodiment stores the area gazetteers corresponding to the present position of a car therein. In Step S21 of FIG. 11, the readup controller 33 first performs a route search in accordance with the shortest-route algorithm or the like to extract a proposed route to the destination. The proposed route is represented as a route indicated by a dotted line in FIG. 12. In Step S22, the readup controller 33 extracts a nodal point Ni (via or transit point) on a route shown in FIG. 13 and lists up nodal points in order. It is confirmed in Step S23 whether the objective nodal point Ni is an endpoint. If the answer is found to be negative in Step S23, then the routine procedure proceeds to Step S24 where the readup controller 23 extracts area numbers including the nodal point Ni. Since the coordinates are originally provided for each nodal point and area numbers are also respectively assigned by high-order digits of coordinates, the area numbers can be easily extracted by simply omitting low-order digits at the nodal point Ni. In Step S25, the readup controller 33 allows the RAM 43 to store area gazetteers corresponding to the respective area numbers therein. By executing a process of Steps S23 to S25 one or more times, one or more area gazetteers corresponding to the traffic proposed route are stored in the RAM 43 in addition to the area gazetteers corresponding to the present position of the vehicle. The process of Steps S23 to S25 is suitably carried out a required number of times according to the capacity of the RAM 43. If the capacity of the RAM 43 is sufficient, then the process referred to above is executed until the nodal point Ni reaches the endpoint, and the area gazetteers corresponding to the traffic proposed route are stored in the RAM 43 up to the endpoint.

According to the sixth embodiment as described above, the required number of area gazetteers corresponding to the proposed route can be loaded into the RAM 43 in advance of the movement of the present position of the car. Therefore, each place name can be produced or sounded with voice at all times without any delay even in the case of a reduced memory capacity. The present embodiment relates to the case in which the first embodiment has the function of storing the area gazetteers corresponding to the proposed route in the memory means. If the area gazetteers corresponding to the proposed route are stored in the RAM 63 or 93 by using the route function executed by the readup controller 51 or 82, then the same effect as described above can be obtained even in the case of other embodiments.

Incidentally, the present invention is not necessarily limited to the above-described embodiments. Various modifications can be made to the embodiments. For example, the following are mentioned as their modifications:

(1) The functions of the buffers 31 and 65, the comparators 32 and 66, the present position detecting means 81 and the like configured by individual pieces of hardware can be also realized by software.

(2) The first through fourth embodiments each relate to a case in which the dictionary structure is applied to a text voice readup system for reading up place names. However, the present system can be applied even to a dictionary structure of a voice recognition system.

(3) The second and third embodiments each relate to a system of loading the corresponding area gazetteer into the memory means composed of a RAM from a two-dimensional storage medium such as the CD-ROM or the like according to the present position information. However, if the present system is provided in a cache configuration with the present position information as a tag, then an advantageous effect can be obtained which can provide quicker loading.

(4) In FIG. 5 showing the second embodiment, the loading of the data into the RAM 63 and reading of the data therefrom have been carried out with two ports. However, one port is commonly used for its loading and reading as an alternative to the two ports and may be selectively used therebetween. In order to realize this application by hardware, a wait signal may be outputted upon the reading when the port is used for the loading, or a path request may be produced based on a load request signal. On the other hand, the implementation of this application by software can be carried out without any problem if an interruption is generated based on the load request signal.

(5) In the third embodiment, area gazetteers are provided so as represent areas which are adjacent to each other, one by one as seen in the vertical and horizontal directions and are stored in addition to each area gazetteer corresponding to the present position. However, two or more area gazetteers may be stored, or only area gazetteers lying in the direction in which the vehicle is headed, may be stored.

According to the first invention as has been described above in detail, the host device employed in the text voice readup system is provided with the buffer means, the comparing means, the area gazetteer reading means and the area gazetteer transferring means. Further, the text readup device has the memory means, and the analysis controller preferentially refers to each area gazetteer. Therefore, the data stored in the ROM is not rendered massive and the retrieval speed is not reduced as in the prior art. It is also possible to prevent the readings from becoming inaccurate due to the homographs.

According to the second invention, the text readup device has the buffer means, the comparing means, the area gazetteer reading means and the memory device. Further, the analysis controller preferentially refers to each area gazetteer. Therefore, the retrieval speed is not reduced and the readings are prevented from becoming inaccurate due to the homographs in a manner similar to the first invention. Further, as compared with the first invention, the host device does not need to replace the dictionary with another.

According to the third invention, since the area gazetteers for the areas lying around each area of which the area gazetteer corresponds to the keyword, which are employed in the first and second inventions, are stored in the memory means as well as each area gazetteer corresponding to the keyword, the readings can be accurately provided even immediately after the movement of the vehicle.

According to the fourth invention, the receiver is provided and the text data is analyzed by reference to each area gazetteer transmitted from the corresponding area base station. The same effect as those obtained by the first through third inventions can be brought about. Further, even if the place names and the like are often changed, an accurate voice readup can be carried out.

According to the fifth invention, each area gazetteer having the structure in which the words, the readings (pronunciation) and the keywords are associated with one another, is stored in the memory means employed in the first through fifth inventions. Further, the host device transfers the text data with the keywords to the analysis controller. It is therefore possible to completely prevent the readings from becoming inaccurate due to the homographs.

According to the sixth invention, since the route searching function and the function of storing one or more area gazetteers including the nodal points on the traffic proposed route in the memory means are provided, the area gazetteers for the traffic proposed route can be stored in the memory means employed in the first through fifth inventions in advance and the next area gazetteer can be prepared in advance. It is thus possible to sound the place names with voice without any delay.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. An apparatus for changing text data into a voice signal based on a present position of a vehicle among positions in a plurality of divided areas, comprising:

a storage medium that stores a main gazetteer divided into a plurality of area gazetteers, each area gazetteer corresponding to position information about positions in at least one of the plurality of divided areas;

area gazetteer reading means for reading an area gazetteer among the plurality of area gazetteers, corresponding to the position information about the present position of the vehicle;

an analysis controller for generating text data corresponding to the position information about the present position and analyzing the text data using the read area gazetteer as a high-priority temporary dictionary; and a text readup device for producing a voice signal corresponding to the text data.

2. An apparatus as claimed in claim 1, wherein said divided areas are separately defined to exclude homographs from the position information about positions in each of the plurality of divided areas.

3. An apparatus as claimed in claim 1, further comprising a memory and means for loading at least one corresponding area gazetteer into said memory in response to a change in the present position information.

4. An apparatus as claimed in claim 3, wherein said means for loading loads a plurality of the area gazetteers into said memory in response to a change in the present position information and includes means for loading area gazetteers for the divided area corresponding to the present position and other divided areas adjacent thereto.

5. An apparatus for changing text data into a voice signal based on a present position of a vehicle among positions in a plurality of divided areas, comprising:

a receiver for receiving from an area base station at least an area gazetteer selected from among a plurality of area gazetteers of a main gazetteer, the main gazetteer being divided into the plurality of area gazetteers and being under the control of said area base station, each area gazetteer corresponding to position information about positions in at least one of the plurality of divided areas;

an analysis controller for generating text data corresponding to position information about the present position of the vehicle and analyzing the text data using each area gazetteer received by said receiver as a high-priority temporary dictionary; and a text readup device for producing a voice signal corresponding to the text data.

6. An apparatus as claimed in claim 1, wherein said each area gazetteer has words, pronunciations of the words, and keywords identifying the area gazetteer and corresponding to the present position information.

7. An apparatus as claimed in claim 1, further comprising route search means for searching a traffic proposed route; and memory means for storing therein an area gazetteer including nodal points on the traffic proposed route.

8. An apparatus as claimed in claim 2, wherein said each area gazetteer has words, pronunciations of the words, and keywords identifying the area gazetteer and corresponding to the present position information.

9. An apparatus as claimed in claim 3, wherein said each area gazetteer has words, their pronunciation, and keywords identifying the area gazetteer and corresponding to the present position information.

10. An apparatus as claimed in claim 4, wherein said each area gazetteer has words, pronunciations of the words, and keywords identifying the area gazetteer and corresponding to the present position information.

11. An apparatus as claimed in claim 5, wherein the receiver receives, from the transmitter, area gazetteers for the divided area corresponding to the present position and other divided areas adjacent thereto.

12. An apparatus for changing text data into a voice signal based on a present position of a vehicle among positions in a plurality of divided areas, comprising:

a storage medium storing a main gazetteer divided into a plurality of area gazetteers, each area gazetteer corresponding to position information about positions in at least one of the plurality of divided areas;

area gazetteer reading means for reading a predetermined number of area gazetteers among the plurality of area gazetteers, corresponding to the position information about the present position of the vehicle;

an analysis controller for generating text data corresponding to the position information about the present position and analyzing the text data using the read predetermined number of area gazetteers as a high-priority temporary dictionary; and a text readup device for producing a voice signal corresponding to the text data.

13. An apparatus as claimed in claim 12, wherein said divided areas are separately defined to exclude homographs from the position information about positions in each of the plurality of divided areas.

14. An apparatus as claimed in claim 12, wherein the predetermined number is a plural number, and further comprising a memory and means for loading the corresponding plural number of area gazetteers into said memory in response to a change in the present position information.

15. An apparatus as claimed in claim 14, wherein said means for loading loads a plurality of the area gazetteers into said memory in response to a change in the present position information and includes means for loading area gazetteers for the divided area corresponding to the present position and other divided areas adjacent thereto.

16. An apparatus for changing text data into a voice signal based on a present position of a vehicle among positions in a plurality of divided areas, comprising:

an area base station having a transmitter, and a storage medium that stores a main gazetteer, the main gazetteer being divided into a plurality of area gazetteers, each area gazetteer corresponding to position information about positions in at least one of the plurality of divided areas;

a receiver for receiving, via the transmitter, at least an area gazetteer selected from among the plurality of area gazetteers of the main gazetteer stored in the storage medium;

an analysis controller for generating text data corresponding to position information about the present position of the vehicle and analyzing the text data using each area gazetteer received by said receiver as a high-priority temporary dictionary; and a text readup device for producing a voice signal corresponding to the text data.

17. An apparatus as claimed in claim 16, further comprising a memory and means for loading the selected area gazetteer into said memory in response to a change in the present position information.

* * * * *